United States Patent
Tofilescu et al.

(10) Patent No.: US 9,951,549 B2
(45) Date of Patent: Apr. 24, 2018

(54) VEHICLE POWER SYSTEMS ACTIVATION BASED ON STRUCTURED LIGHT DETECTION

(71) Applicant: Flextronics AP, LLC, Broomfield, CO (US)

(72) Inventors: Pompilian Tofilescu, Toronto (CA); Sandor Zsombory, Newmarket (CA)

(73) Assignee: Flectronics AP, LLC, San Jose, CA (US)

( * ) Notice: Subject to any disclaimer, the term of this patent is extended or adjusted under 35 U.S.C. 154(b) by 88 days.

(21) Appl. No.: 14/268,165

(22) Filed: May 2, 2014

(65) Prior Publication Data

US 2015/0127193 A1    May 7, 2015

Related U.S. Application Data

(60) Provisional application No. 61/898,920, filed on Nov. 1, 2013.

(51) Int. Cl.
| | |
|---|---|
| *B60R 25/20* | (2013.01) |
| *B60R 25/24* | (2013.01) |
| *G07C 9/00* | (2006.01) |
| *E05F 15/73* | (2015.01) |

(52) U.S. Cl.
CPC .......... *E05F 15/73* (2015.01); *B60R 25/2054* (2013.01); *B60R 25/24* (2013.01); *G07C 9/00309* (2013.01); *E05F 2015/767* (2015.01); *E05Y 2400/82* (2013.01); *E05Y 2400/852* (2013.01); *E05Y 2400/858* (2013.01); *E05Y 2800/106* (2013.01); *E05Y 2900/546* (2013.01)

(58) Field of Classification Search
CPC ......... E05Y 2400/852; E05Y 2400/854; E05Y 2400/856; E05Y 2400/858; E05Y 2900/546; E05F 15/70; E05F 15/73–15/79; B60R 25/2054; E05B 85/01; E05B 81/20; E05B 81/78
See application file for complete search history.

(56) References Cited

U.S. PATENT DOCUMENTS 5,929,769 A * 7/1999 Garnault ............. B60R 25/2009
                                                                340/12.51
6,825,752 B2 * 11/2004 Nahata .................... E05B 81/78
                                                                180/273

(Continued)

FOREIGN PATENT DOCUMENTS

| FR | 2936545 A1 | 4/2010 |
|---|---|---|
| WO | 2011/026763 A1 | 10/2011 |
| WO | 2013/037806 A1 | 3/2013 |

*Primary Examiner* — John Olszewski
*Assistant Examiner* — Thomas E Worden
(74) *Attorney, Agent, or Firm* — Volpe and Koenig, P.C.

(57) ABSTRACT

A method and apparatus for activating a vehicle entry power system using structured light detection are described herein. The method may include waking up the vehicle entry power system utilizing keyfob detection, waking up a smart camera, turning on, by the smart camera, a laser diode, wherein the laser diode projects a light pattern on the ground for a predetermined period of time, stepping, by a user, on the light pattern, detecting, by the smart camera, a shape change in the light pattern, and signaling to the vehicle entry power system to activate a lift gate opening.

18 Claims, 8 Drawing Sheets

(56) References Cited

U.S. PATENT DOCUMENTS

| | | | | |
|---|---|---|---|---|
| 8,228,166 B2* | 7/2012 | Eberhard | ............ | B60R 25/2036 |
| | | | | 340/5.61 |
| 8,788,152 B2* | 7/2014 | Reimann | ............ | B60R 25/2036 |
| | | | | 296/146.4 |
| 9,641,763 B2* | 5/2017 | Bernal | ............... | H04N 5/23296 |
| 2006/0093203 A1* | 5/2006 | Good | ................... | G06T 7/0004 |
| | | | | 382/141 |
| 2008/0129446 A1* | 6/2008 | Vader | ...................... | B60R 25/24 |
| | | | | 340/5.6 |
| 2008/0296926 A1* | 12/2008 | Hanzel | ............... | B60R 25/2054 |
| | | | | 296/146.1 |
| 2010/0019042 A1* | 1/2010 | Barkan | ............. | G06K 7/10683 |
| | | | | 235/462.41 |
| 2010/0277108 A1* | 11/2010 | McDonnell | ............... | F21L 4/00 |
| | | | | 315/360 |
| 2014/0009264 A1 | 1/2014 | Song et al. | | |
| 2014/0080605 A1* | 3/2014 | Peddi | ................. | G09B 19/0038 |
| | | | | 463/32 |

\* cited by examiner

US 9,951,549 B2

VEHICLE POWER SYSTEMS ACTIVATION BASED ON STRUCTURED LIGHT DETECTION

CROSS REFERENCES TO RELATED APPLICATIONS

This application claims the benefit of U.S. Provisional Application No. 61/898,920, filed Nov. 1, 2013, the content of which is incorporated by reference herein.

FIELD OF INVENTION

This application is related to vehicle electronics.

BACKGROUND

Vehicles have a number of power entry systems which may include automatic power lift gates, trunk lids or hoods, sunroofs, sliding doors, and doors. Users may want to use a touch-less activation of the power entry systems upon approaching the vehicle or when they are in the vehicle due to security or convenience reasons.

Most of the newer vehicles are also equipped with a Radio Frequency (RF) system that is able to detect and verify if a keyfob/transponder associated with the vehicle is in the immediate proximity of the vehicle and "wake-up" the vehicle.

SUMMARY

Described herein is a system and method of activating vehicle power entry systems based on structured light detection.

The system includes a coherent light emitter (CLE), for example a laser or laser diode, and a camera with image processing capability integrated in the same package or a camera connected to an image processing Electronic Control Unit (ECU), and connected to the power entry system controller.

Upon detection and verification of the transponder/keyfob, when a user approaches the vehicle, the CLE will project a pattern of light on the ground. If the person steps on the image projected on the ground, the camera will detect the change on the projected pattern (structured light detection) and communicate to the power entry system controller to activate the system.

BRIEF DESCRIPTION OF THE DRAWINGS

A more detailed understanding may be had from the following description, given by way of example in conjunction with the accompanying drawings wherein:

FIG. 7 is an example of a person detected and a CLE turned on; and

DETAILED DESCRIPTION

Figure 1:
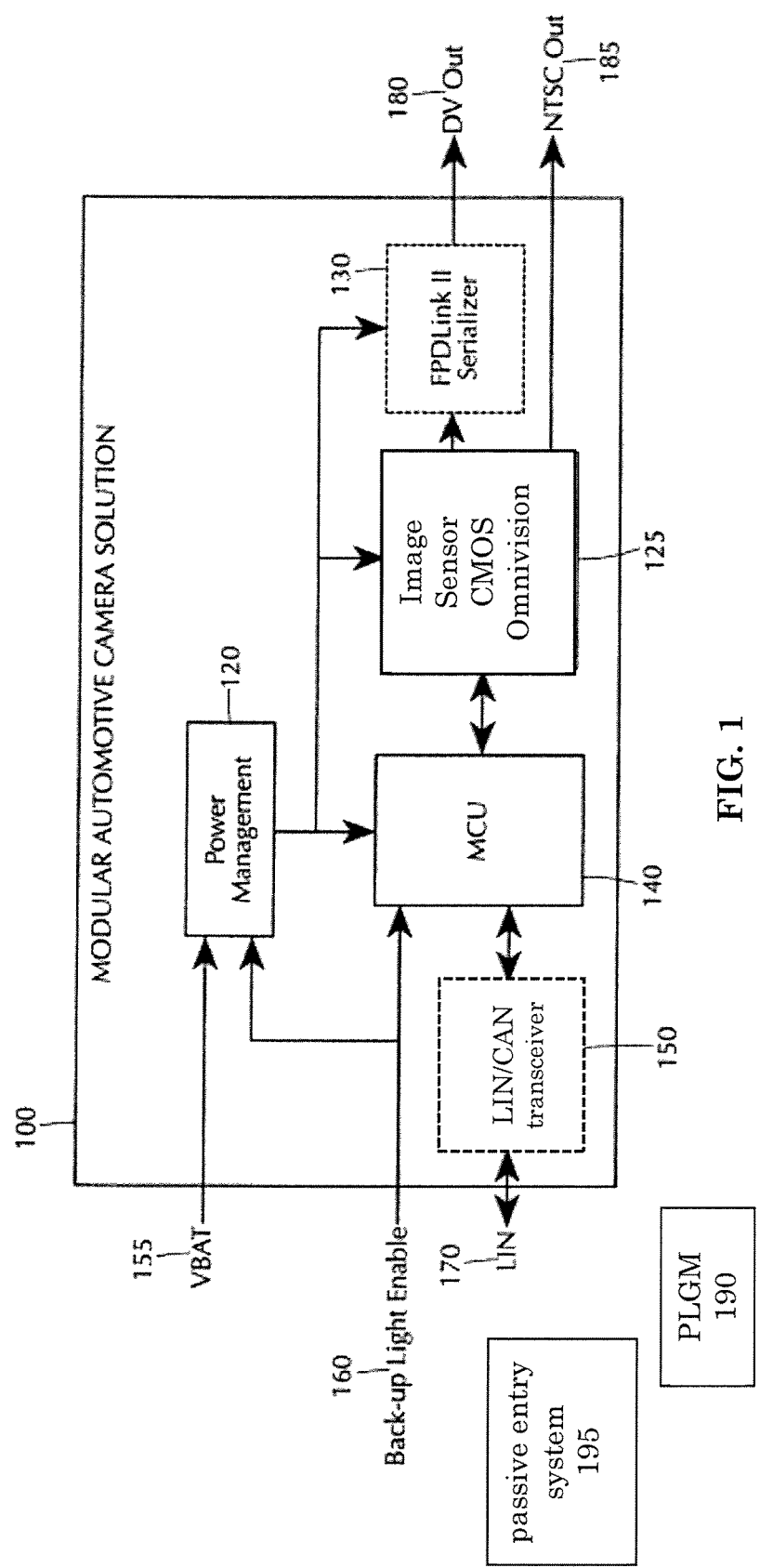
FIG. 1 is an embodiment of a Modular Automotive Camera Solution (MACS) module.

It is to be understood that the figures and descriptions of embodiments of a system and method of activating or triggering predetermined functions for vehicle electromechanical systems based on image recognition and radio frequency systems have been simplified to illustrate elements that are relevant for a clear understanding, while eliminating, for the purpose of clarity, many other elements found in typical vehicle systems. Those of ordinary skill in the art may recognize that other elements and/or steps are desirable and/or required in implementing the present invention. However, because such elements and steps are well known in the art, and because they do not facilitate a better understanding of the present invention, a discussion of such elements and steps is not provided herein.

The non-limiting embodiments described herein are with respect to system and method of activating or triggering predetermined functions for vehicle electromechanical systems based on image recognition and radio frequency systems. Other electronic devices, modules and applications may also be used in view of these teachings without deviating from the spirit or scope as described herein. The system and method of activating or triggering predetermined functions for vehicle electromechanical systems based on image recognition and radio frequency systems may be modified for a variety of applications and uses while remaining within the spirit and scope of the claims. The embodiments and variations described herein, and/or shown in the drawings, are presented by way of example only and are not limiting as to the scope and spirit. The descriptions herein may be applicable to all embodiments of the system and method of activating or triggering predetermined functions for vehicle electromechanical systems based on image recognition and radio frequency systems although it may be described with respect to a particular embodiment.

Described herein is a system and method of activating vehicle power entry systems based on structured light detection.

The system includes a coherent light emitter (CLE), for example a laser or laser diode, and a camera with image processing capability integrated in the same package or a camera connected to an image processing Electronic Control Unit (ECU), and connected to the power entry system controller.

FIG. 1 is an embodiment of a Modular Automotive Camera Solution (MACS) module 100. The MACS module 100 includes a power management module 120 that is connected to a microcontroller 140, an image sensor 125, and if available, a serializer 130. The microcontroller (MCU) 140 may be further connected to a local interconnect network (LIN)/control area network (CAN) transceiver 150 and to the image sensor 125, which in turn may be connected to the serializer 130. Although the LIN/CAN transceiver is shown to describe the embodiments, any communication bus (COMM) may be used. For example the COMM may be a LIN bus, a CAN bus, a hardwired input, or any other automobile communication system or network The MACS module 100 receives as inputs a battery voltage 155 and enable signal 160 from a passive entry system 195. The power management module 120 converts the battery voltage 155 and supplies the required voltages to the MCU 140, the image sensor 125, and if available, the serializer 130. The image sensor 125, for example, is a complementary metal-oxide-semiconductor (CMOS) sensor based camera. The enable signal 160 is sent to the power management module 120 and the MCU 140 when identification is authenticated or verified, (for example, a key fob is detected). The MACS module 100 can be configured to output an analog National Television System Committee (NTSC) composite video signal 185 from the image sensor 125 and/or a digital video 180 through a low voltage differential signaling (LVDS) output in the serializer 130. The LIN/CAN transceiver 150 is configured to communicate via a LIN bus 170 with other vehicle electronic components or modules in the vehicle such as, for example, a passive entry system/module and a power lift gate module (PLGM) 190.

In general, the MACS module 100 is configured to recognize the presence of a user and to control the opening of, for example, a lift gate. The MACS module 100 is installed as a rear view camera module in the vehicle and works in conjunction with a passive entry system and PLGM. The MACS module 100 functions as a sensor as part of a lift gate drive system/motor control mechanism. The MACS module can also be used in a minimal configuration as an automotive rear view camera or can be used in conjunction with a master module for image processing in driver assist applications like birds eye view, blind spot detection, and the like.

Figure 2:
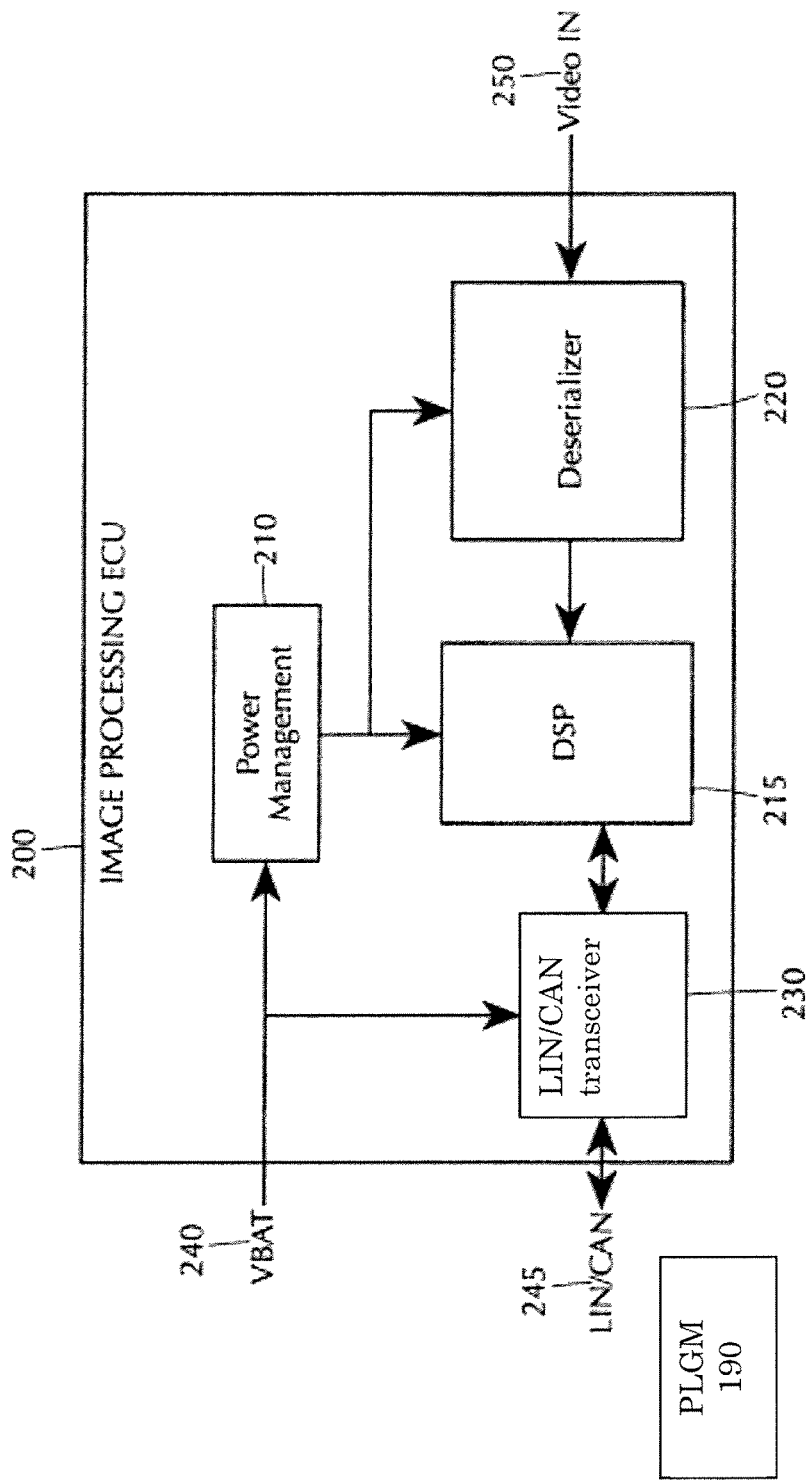
FIG. 2 is an embodiment of an image processing engine (IPE) module that includes a power management module connected to a digital signal processor (DSP) and if applicable or available, a deserializer.

FIG. 2 is an embodiment of an image processing engine (IPE) module 200 that includes a power management module 210 connected to a digital signal processor (DSP) 215 and if applicable or available, a deserializer 220. The DSP 215 may be further connected to a LIN/CAN transceiver 230 and to the deserializer 220. The LIN/CAN transceiver 230 is configured to communicate via a LIN/CAN bus 245 with other vehicle electronic components or modules in the vehicle such as, for example, a passive entry system/module and a PLGM 190.

The IPE 200 receives as input a battery voltage 240 and a video information signal 250. The power management module 210 converts the battery voltage 240 and supplies the required voltages to the DSP 215 and if available, the deserializer 220. The video signal 250 is received by the deserializer 220, which in turn sends the video information signal 250 to the DSP 215 for analysis.

The IPE 200 performs image processing and communicates with both the PLGM 190 and the MACS module 100. The IPE 200 receives the video information signal 250 and based on an image processing algorithm in the DSP 215 decides if a person is standing at the back of the car. The algorithm can be based on light, contour or color gradient changes. The algorithm differentiates between a person standing and a passerby. In case of a positive determination, the IPE 200 communicates to the PLGM 190 via the LIN transceiver 230 over the LIN/CAN bus 245 to open the lift gate.

Operationally, a person will need to carry the proper identification, i.e. a key fob or other similar identification and be in the field of view of the rearview camera of the MACS module 100. The passive entry system 195 detects and/or authenticates the key fob, and sends an enable signal 160 to the PLGM 190, IPE 200 and the MACS module 100. Upon detection and verification of the transponder/keyfob, when a user approaches the vehicle, the CLE will project a pattern of light on the ground. If the person steps on the image projected on the ground, the camera will detect the change on the projected pattern (structured light detection) and communicate to the power entry system controller to activate the system.

The power lift gate is used as an exemplification of the power entry system. For example, other power entry systems may include power door locks and a powered sliding back door. The camera with the image processing capability or the camera+image processing ECU assembly will be called a "smart" camera. The "smart" camera is connected to the power lift gate control module, either through the vehicle communication bus, or through a 2 way hardwire connection.

The CLE may be controlled/connected either by the Power Lift Gate Module (PLGM) or by the "smart" camera.

The method described here can work in conjunction with an image/object detection algorithm residing in the "smart" camera that can detect if a person moves behind the vehicle within a predefined zone of interest within the field of view of the camera. The "smart" camera/PLGM will turn on the CLE only if the person is in the zone of interest.

Figure 3:
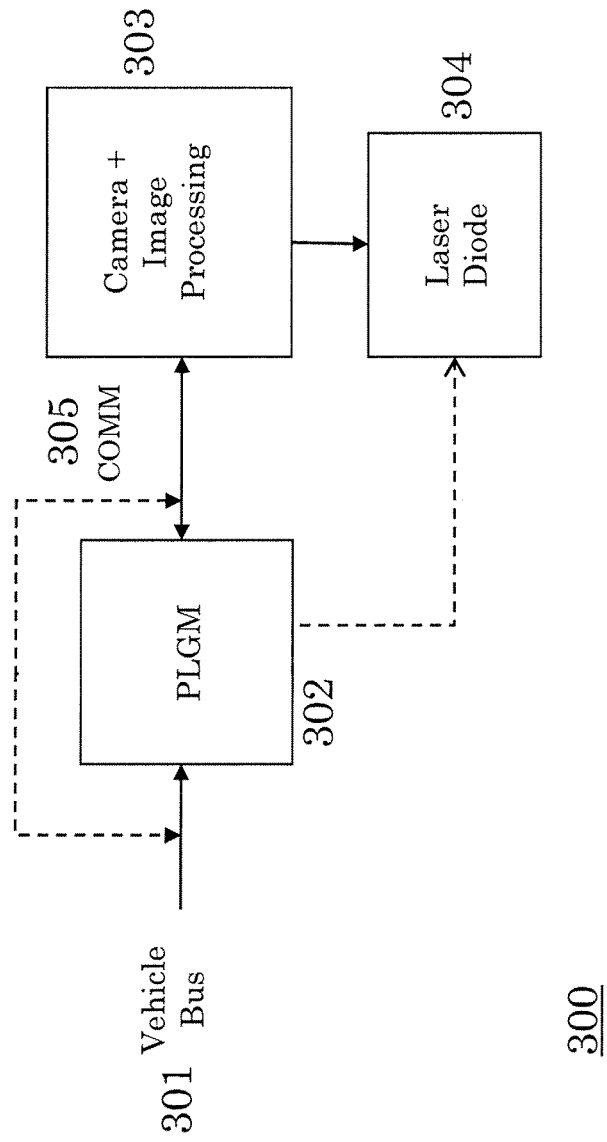
FIG. 3 is an example block diagram of the vehicle entry power systems activation.

FIG. 3 is an example block diagram of the vehicle entry power systems activation. The vehicle power entry system 300 may include a vehicle communication bus 301, a PLGM 302, a camera with image processing capability or "smart" camera 303, and a laser diode 304. The PLGM 302 is connected to the "smart" camera 303 via a communications bus (COMM) 305. The COMM 305 may be a LIN bus, a CAN bus, a hardwired input, or any other automobile communication system or network. The laser diode 304 may be controlled by either the PLGM 302 or the "smart" camera 303.

The PLGM 302 will be awaken by the keyfob detection, and in turn will wake up the "smart" camera 303. The "smart" camera 303 (or the PLGM) will turn on the laser diode 304 which will project on the ground a light pattern for a predetermined period of time. The light pattern can be a line, for example, 2 parallel lines or a more complicated image. To keep the coherent light emitter simple but to ensure a robust detection, the pattern should be at least 2 parallel lines.

When the person steps on the 2 projected lines it will change the 3D shape of the line. The "smart" camera 303 detects the shape change (structured light detection) and signals to the power lift gate controller to activate the lift gate opening. The feedback/acknowledgment of valid detection can be signaled back to the person by various means: turn off laser, blink laser a couple of times, blink vehicle back-up lights, so on. If during the predetermined time the light pattern is not changed the laser is turned off and the system goes back to sleep.

Figure 4:
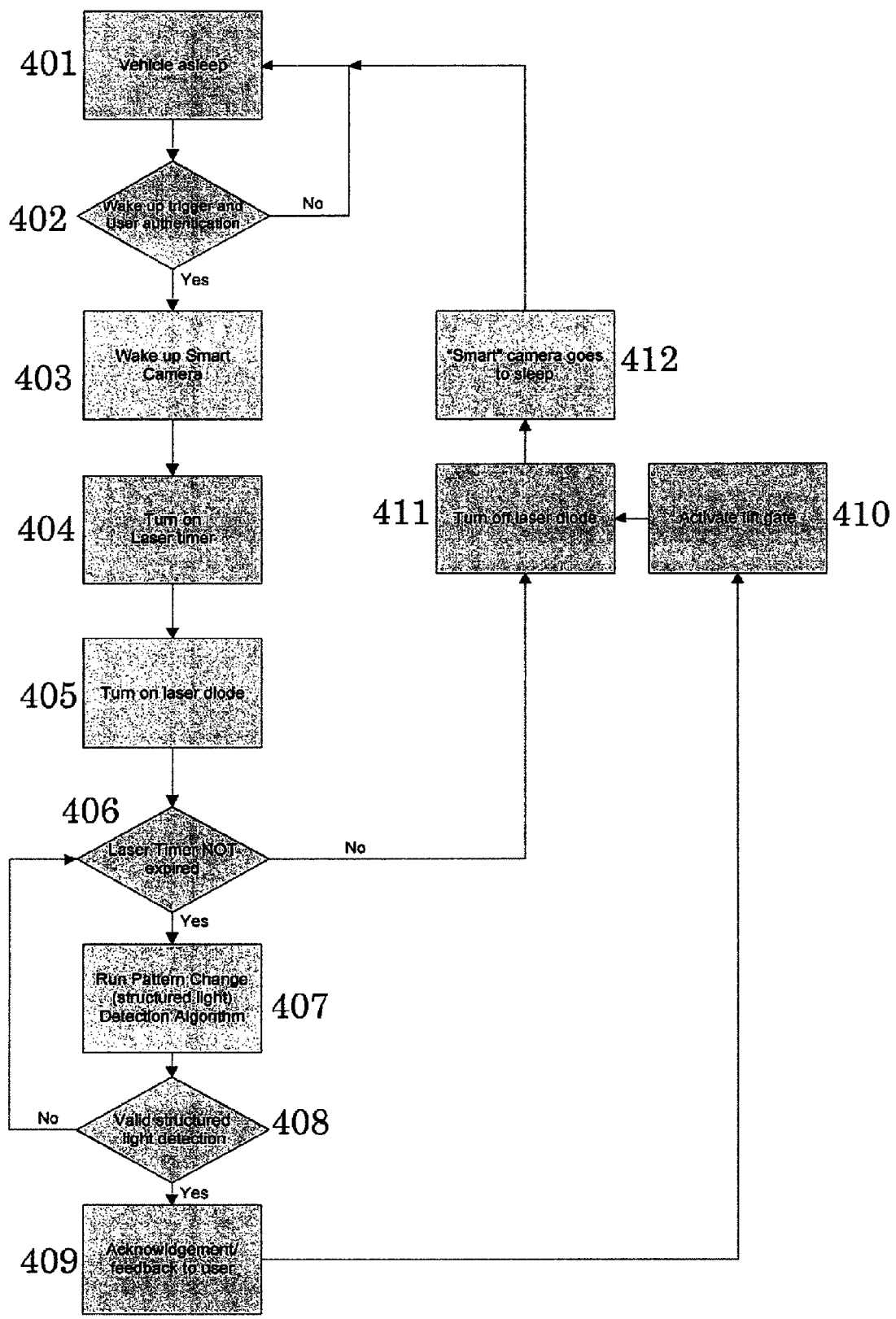
FIG. 4 is an example flow diagram without a zone of interest.

FIG. 4 is an example flow diagram without a zone of interest. In FIG. 4, at first the vehicle is asleep (401). The vehicle receives a wake up trigger and user authentication (402). If the user is not authenticated, the vehicle goes back to sleep (401). If the user is authenticated the "smart" camera is woken up (403). A laser timer is then turned on (404). A laser diode is then turned on (405). If the laser timer has not expired (406), a pattern change detection algorithm is run (407).

If there is a valid structured light detection (408), an acknowledgement/feedback is communicated to the user (409), for example, turning off the laser, blinking the laser a couple of times, blinking the vehicle back-up lights, and the like. Once the acknowledgement/feedback is communicated to the user (409), the lift gate is activated (410). After the lift gate is activated (410), the laser diode is turned off (411), the "smart" camera goes to sleep (412), and the vehicle goes back to sleep (401).

If there is no valid structured light detection (408), the vehicle checks to see if the laser timer has not expired (406).

If the laser timer has expired, the laser diode is turned off (411), the "smart" camera goes to sleep (412), and the vehicle goes back to sleep (401).

If the zone of interest detection is available, after the light pattern is turned off, the "smart" camera checks again the zone of interest. If the person is still there then the method repeats, starting with the "smart" camera (or the PLGM) turning on the laser diode which will project on the ground a light pattern for a predetermined period of time. If no person is there then the entire system goes back to sleep.

Figure 5:
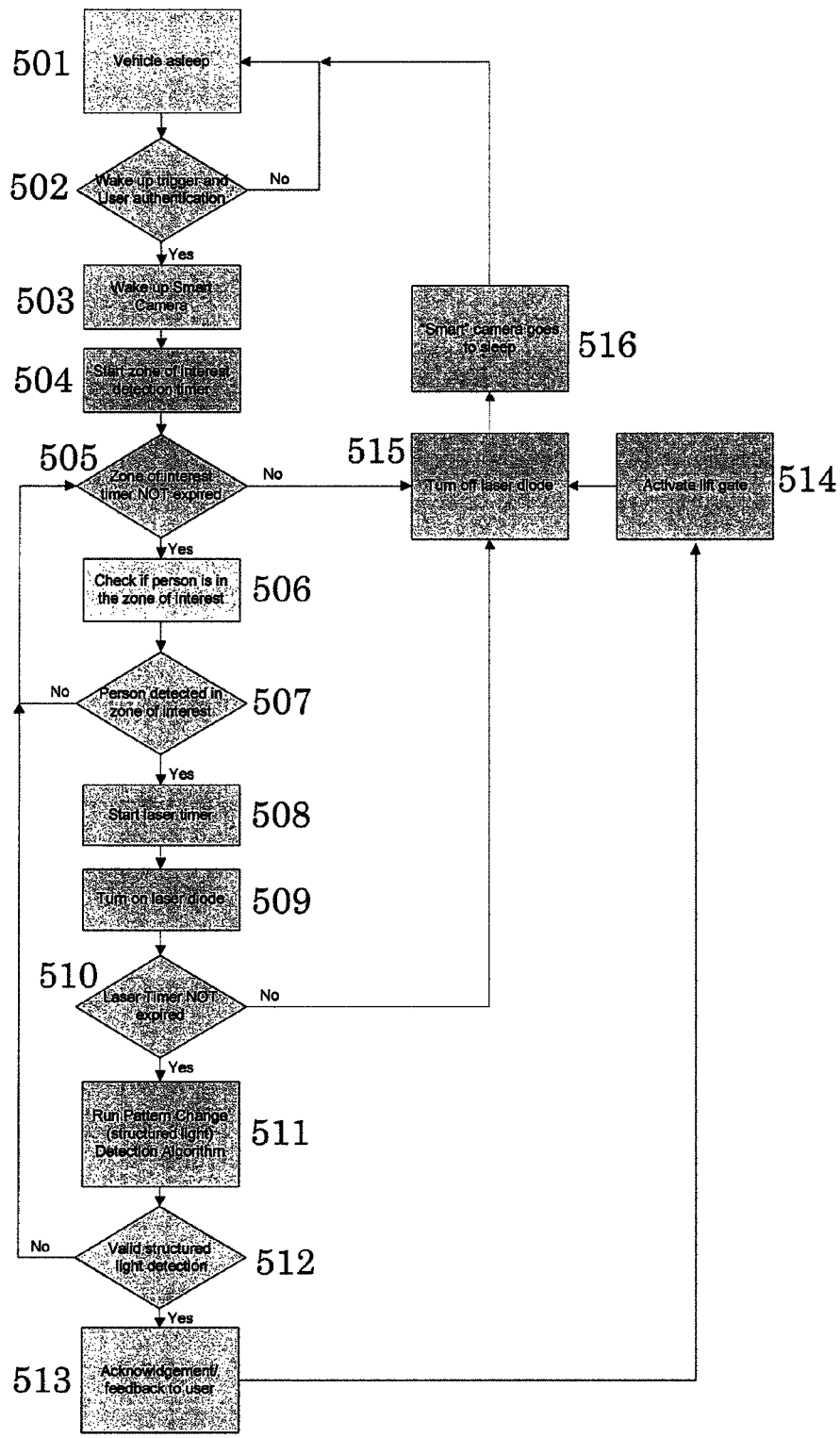
FIG. 5 is an example flow diagram with a zone of interest.

FIG. 5 is an example flow diagram with a zone of interest.

In FIG. 5, at first the vehicle is asleep (501). The vehicle receives a wake up trigger and user authentication (502). If the user is not authenticated, the vehicle goes back to sleep (501). If the user is authenticated the "smart" camera is woken up (503). A zone of interest detection timer is then started (504). If the zone of interest timer has not expired (505), the vehicle checks to see if the person is in the zone of interest (506). If a person is detected in the zone of interest (507), a laser timer is then turned on (508). A laser diode is then turned on (509). If the laser timer has not expired (510), a pattern change detection algorithm is run (5100).

If there is a valid structured light detection (512), an acknowledgement/feedback is communicated to the user (513), for example, turning off the laser, blinking the laser a couple of times, blinking the vehicle back-up lights, and the like. Once the acknowledgement/feedback is communicated to the user (513), the lift gate is activated (514). After the lift gate is activated (514), the laser diode is turned off (515), the "smart" camera goes to sleep (516), and the vehicle goes back to sleep (501).

If the zone of interest timer has expired (505), the laser diode is turned off (515), the "smart" camera goes to sleep (516), and the vehicle goes back to sleep (501).

If there is no person detected in the zone of interest (507), the vehicle checks to see if the zone of interest timer has not expired (505).

If the laser timer has expired, the laser diode is turned off (515), the "smart" camera goes to sleep (516), and the vehicle goes back to sleep (501).

If there is no valid structured light detection (512), the vehicle checks to see if the zone of interest timer has not expired (505).

Figure 6:
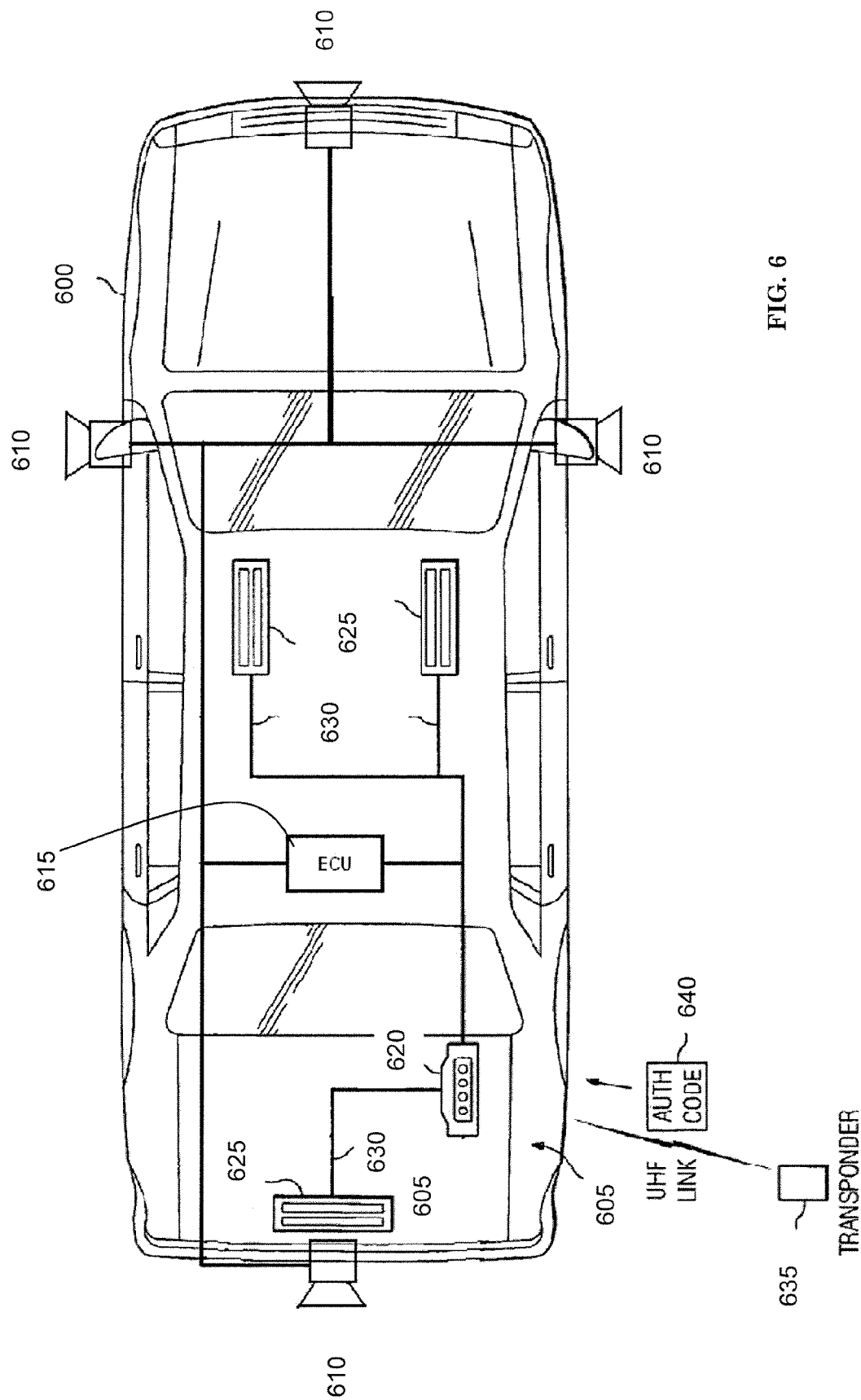
FIG. 6 is an embodiment of a vehicle that enables a person to activate or trigger predetermined functions associated with electromechanical systems using gestures.

FIG. 6 is an embodiment of a vehicle 600 that enables a person to activate or trigger predetermined functions associated with electromechanical systems using gestures. The vehicle 600 includes any structure or component including roof, sidewalls, doors, windows, bumpers, seats, mirrors, and the like. The vehicle 600 includes a radio frequency (RF) system 605, and one or more camera modules 610 as described herein above, all of which are connected to one of more ECUs 615. The camera modules 610 are located throughout the vehicle 600 including at the rear, front, side mirrors, rear view mirror and other like locations. The CLE may be integrated or co-located with the camera module 610.

The RF system 605 may include an RF controller 620 that is configured to transmit and receive RF frequency signals. The RF controller 620 may be configured as a single unit or multiple units. The RF controller 620 may be in communication with one or more RF antennas 625. In an embodiment, communication paths 630 between the RF antennas 625 and RF controller 620 may be hardwired or wireless. The RF antennas 625 may be coupled to the vehicle 600 in any manner. The number of antennas 625 may vary depending on the size, model, type, or any other difference between vehicles. The vehicle 600 may be any motor, rail, aircraft, watercraft or the like vehicle that is consumer, commercial, military or the like. A transponder/keyfob 635 may be used to communicate with the RF controller 620 via the RF antennas 625. The transponder or keyfob 635 may be a passive transponder or keyfob, (e.g., radio frequency identification (RFID) tag), an active transponder or keyfob or a semi-passive transponder or keyfob.

Figure 7:
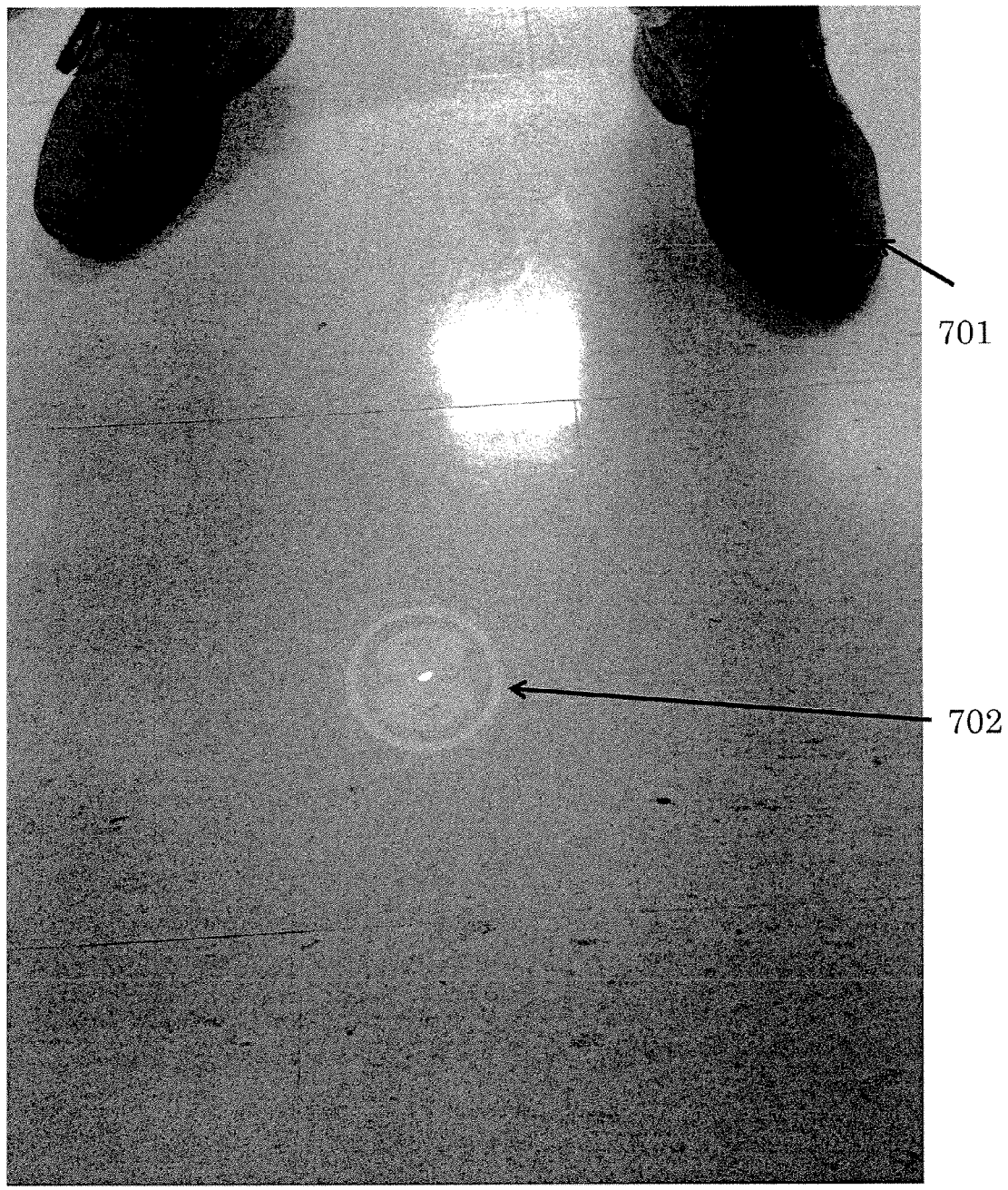

FIG. 7 is an example user detected and the laser diode turned on. The user 701, either in the zone of detection or by waking up the vehicle with a key fob, activates the laser diode. The laser diode projects an image 702 onto the ground.

Figure 8:
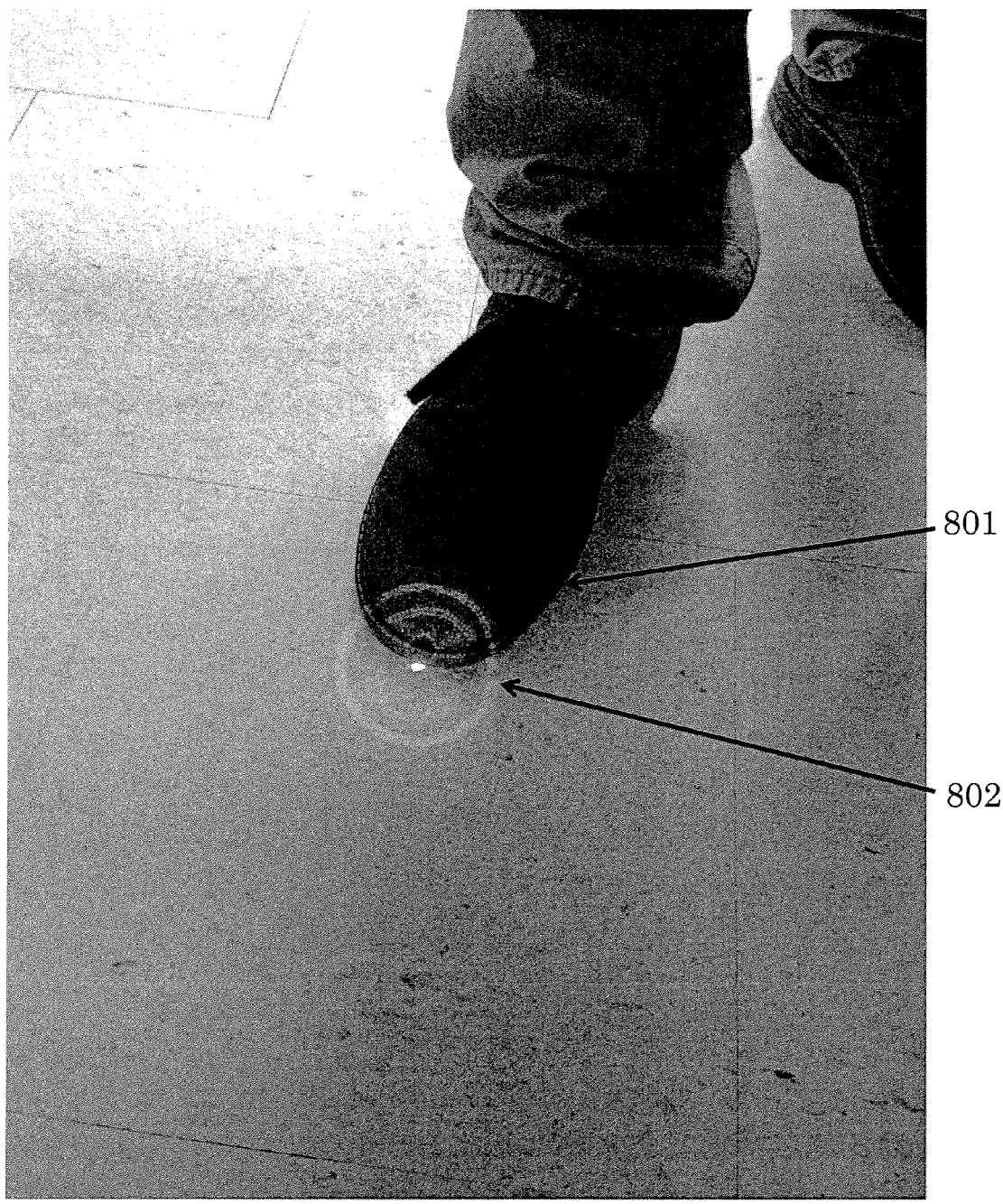
FIG. 8 is an example of a pattern change recognized as a trigger for further actions.

FIG. 8 is an example pattern change recognized as a trigger for further actions. When the user 801 interacts with the projected image 802, the pattern changes and activates the power entry system, for example, the lift gate.

As described herein, the methods described herein are not limited to any particular element(s) that perform(s) any particular function(s) and some steps of the methods presented need not necessarily occur in the order shown. For example, in some cases two or more method steps may occur in a different order or simultaneously. In addition, some steps of the described methods may be optional (even if not explicitly stated to be optional) and, therefore, may be omitted. These and other variations of the methods disclosed herein will be readily apparent, especially in view of the description of the systems described herein, and are considered to be within the full scope of the invention.

Although features and elements are described above in particular combinations, each feature or element can be used alone without the other features and elements or in various combinations with or without other features and elements.

What is claimed:
1. A method for activating a vehicle entry power system using structured light detection when the vehicle entry power system is in sleep mode, the method comprising:
   detecting a presence of a keyfob;
   waking up the vehicle entry power system based on the presence of the keyfob being detected;
   waking up a smart camera;
   determining if a user is within a zone of interest, wherein the zone of interest is within a predefined region of a field of view of the smart camera;
   turning on a laser diode if the user is determined to be within the zone of interest, wherein the laser diode projects a first light pattern on ground adjacent to the vehicle for a predetermined period of time;
   detecting, by the smart camera, a shape change in the first light pattern indicating a user has stepped into the first light pattern; and
   on a condition that the shape change is detected:
      projecting, by the laser diode, a second light pattern that indicates to the user the shape change was detected; and
      activating the vehicle entry power system; and
   causing the power entry system to go to sleep, on a condition that there is no shape change in the first light pattern projected after the predetermined period of time has expired.

2. The method of claim 1, wherein the vehicle entry power system is at least one member of a group consisting of: a power lift gate module, a power sliding rear door, and a power door lock.

3. The method of claim 1, wherein the first light pattern is at least two parallel lines.

4. The method of claim 1, wherein the user receives an acknowledgement of valid detection of the shape change in the first light pattern detected by the smart camera.

5. The method of claim 1, wherein the laser diode is turned off and the smart camera goes to sleep after the vehicle entry power system is activated.

6. The method of claim 4, wherein the acknowledgment is at least one member of a group consisting of: turning the laser diode off, blinking the laser diode at least two times, and blinking back-up lights of the vehicle.

7. The method of claim 1, further comprising:
 initiating, based on the presence of the keyfob being detected, a zone of interest detection timer; and
 causing the vehicle power entry system to go to sleep on a condition that the user has not been detected within the zone of interest prior to the zone of interest detection timer expiring.

8. A system for activating a vehicle power entry system when the vehicle power entry system is in sleep mode, the system comprising:
 a keyfob sensor that authenticates a user;
 a laser diode;
 a smart camera that detects if a user moves into a zone of interest, wherein the zone of interest is within a predefined region of a field of view of the smart camera; and
 an electronic control unit (ECU) that is communicatively coupled to the keyfob sensor, the laser diode and the smart camera;
 wherein the ECU;
 wakes up the vehicle power entry system based on the keyfob sensor authenticating the user,
 turns on the laser diode if the user is detected in the zone of interest by the smart camera,
 projects, using the laser diode, a first light pattern on ground adjacent to the vehicle for a predetermined period of time on a condition that the user is detected in the zone of interest,
 detects, using the smart camera, a shape change in the first light pattern that indicates a user has stepped into the first light pattern,
 on a condition that the shape change is detected:
  projects, using the laser diode, a second light pattern that indicates to the user that the shape change was detected, and
  activates the vehicle entry power system, and
 causes the vehicle power entry system to go to sleep on a condition that there is no shape change in the first light pattern projected after the predetermined period of time has expired.

9. The system of claim 8, wherein the vehicle entry power system is at least one member of a group consisting of: a power lift gate module, a power sliding rear door, and a power door lock.

10. The system of claim 8, wherein the first light pattern is at least two parallel lines.

11. The system of claim 8, wherein an acknowledgement of valid detection of the shape change in the first light pattern detected by the smart camera occurs, and the acknowledgement is provided to the user.

12. The system of claim 8, wherein the laser diode is turned off and the smart camera goes to sleep after the vehicle entry power system is activated.

13. The system of claim 11, wherein the acknowledgment is at least one member of a group consisting of: turning the laser diode off, blinking the laser diode at least two times, and blinking back-up lights of the vehicle.

14. The system of claim 8, wherein the ECU further:
 initiates, based on of the keyfob being authenticated, a zone of interest detection timer, and causes the vehicle power entry system to go to sleep on a condition that the user has not been detected within the zone of interest prior to the zone of interest detection timer expiring.

15. A vehicle comprising:
 a radio frequency system that authenticates a corresponding keyfob;
 a smart camera that detects if a user moves into a zone of interest, wherein the zone of interest is within a predefined region of a field of view of the smart camera;
 a laser diode; and
 an electronic control unit (ECU) that is communicatively coupled to the radio frequency system, the laser diode and the smart camera;
 wherein the ECU;
 wakes up a vehicle power entry system based on the radio frequency system authenticating the user,
 turns on the laser diode if the user is detected in the zone of interest by the smart camera,
 projects, using the laser diode, a first light pattern on ground adjacent to the vehicle for a predetermined period of time on a condition that the user is detected in the zone of interest,
 detects, using the smart camera, a shape change in the first light pattern projected that indicates the user has stepped into the first light pattern,
 on a condition that the shape change is detected:
  projects, using the laser diode, a second light pattern that indicates to the user that the shape change was detected, and
  activates the vehicle entry power system; and
 causes the vehicle power entry system to go goes to sleep on a condition that there is no shape change in the first light pattern projected after the predetermined period of time has expired.

16. The system of claim 15, wherein the vehicle entry power system is at least one member of a group consisting of: a power lift gate module, a power sliding rear door, and a power door lock.

17. The system of claim 15, wherein the first light pattern is at least two parallel lines.

18. The system of claim 15, wherein the ECU further:
 initiates, based on of the keyfob being authenticated, a zone of interest detection timer, and
 causes the vehicle power entry system to go to sleep on a condition that the user has not been detected within the zone of interest prior to the zone of interest detection timer expiring.

* * * * *